United States Patent Office 2,792,231
Patented May 14, 1957

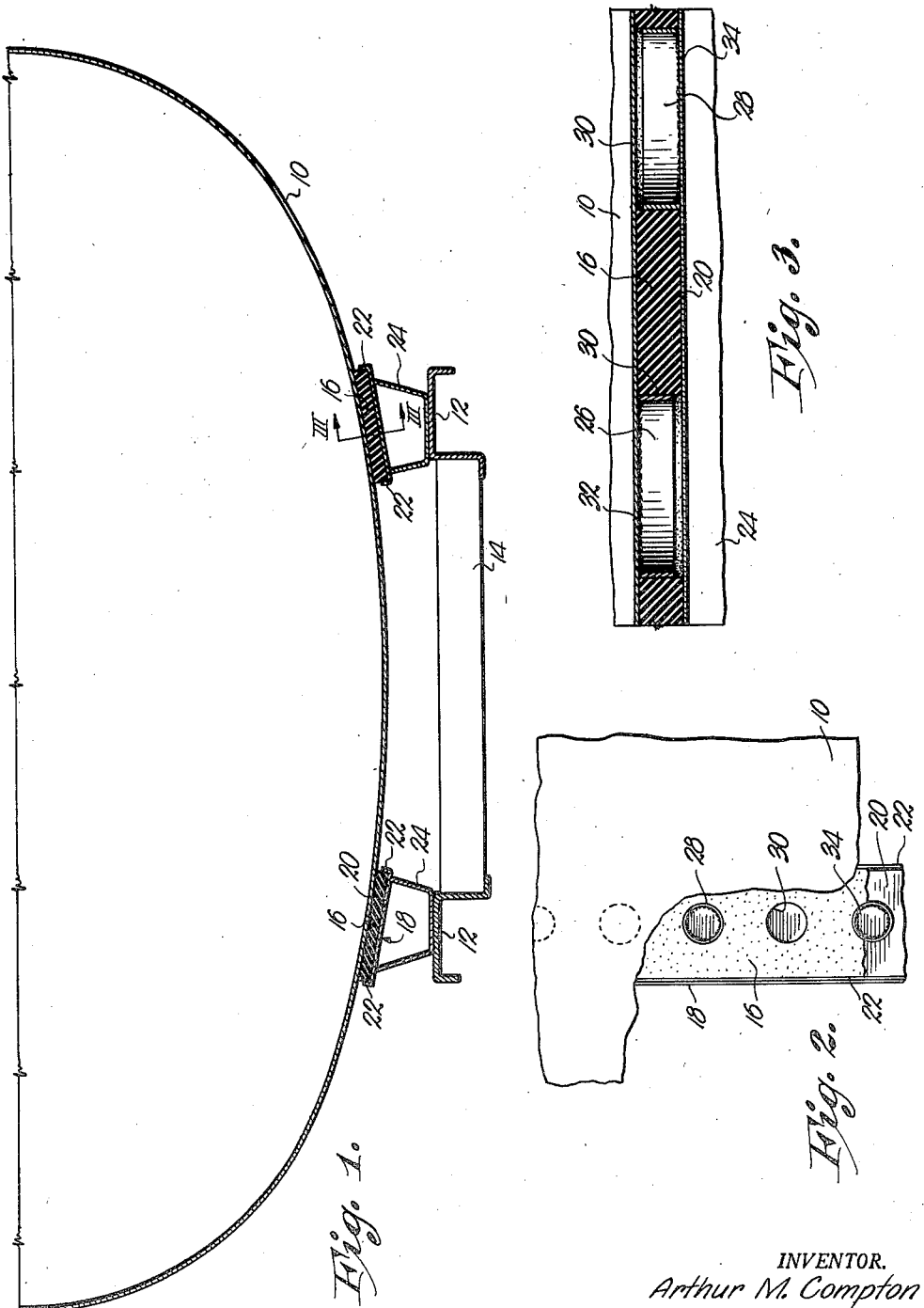

2,792,231

RESILIENT SUPPORT FOR TANK SHELLS

Arthur M. Compton, Bethel, Kans., assignor, by mesne assignments, to Standard Steel Works, Inc., North Kansas City, Mo., a corporation of Texas Application July 26, 1955, Serial No. 524,371

4 Claims. (Cl. 280—5)

This invention relates to improvements in structure for mounting tanks or the like upon the chassis of a mobile vehicle such as a truck or semi-trailer, the primary object being to eliminate the factors of conventional mounting arrangements which tend to damage the tank shell by virtue of the stresses, strains and other forces imparted thereto through the chassis and the mounting structure during normal use.

It is the most important object of the instant invention to provide a novel mounting structure which in effect floatingly supports the tank shell on the underlying framework or chassis of the vehicle to the end that all twisting or other movement of the supporting framework incident to varying conditions of travel are not imparted directly to the tank shell in a manner to cause damage thereto.

Another important object of the instant invention is the provision of improved mounting structure that entirely eliminates the conventional metal-to-metal interconnection between the tank shell and the chassis-supported sills, beams and other framework disposed in underlying supporting relationship to the tank.

A further object of the present invention is to provide a resilient support for tank shells that not only serves as a shock-absorbing medium, but more particularly, by virtue of the fact that it is bonded or otherwise affixed to the shell and to underlying supporting sills therefor, permits relative movement between the shell and the sills in all directions, thereby avoiding strain on the shell and especially on the seams thereof.

A still further important object of the present invention is to provide a support of the aforementioned character that embodies the utilization of resilient strips as the sole means of supporting the shell and connecting the same with the chassis.

An additional object of this invention is to provide resilient strips of rubber or the like for interconnecting the tank and the chassis, together with suitable retainers for holding the tank against longitudinal and lateral movement with respect to the chassis, certain of the retainers extending through the resilient strips.

In the drawing:

Figure 1 is a fragmentary, transverse, cross-sectional view through a tank shell showing a pair of resilient supports therefor made according to the present invention.

Fig. 2 is a fragmentary, inside view looking downwardly with the tank shell broken away to reveal details of construction; and Fig. 3 is an enlarged, fragmentary, cross-sectional view taken on line III—III of Fig. 1.

In the drawing the numeral 10 designates the shell of a hollow tank of the kind commonly employed for the hauling of liquids through use of a mobile vehicle such as a truck, trailer or semi-trailer. Manifestly, such vehicle is provided with a chassis overlying the undercarriage thereof (not shown), which includes or has mounted thereon, a pair of longitudinal beams or sills 12, such framework 12—12 may be interconnected in any suitable manner and, therefore, for illustrative purposes, a cross member 14 is shown in Fig. 1.

Conventionally, the shell 10 is secured to the beams 12 or to saddle structure mounted thereon by a direct connection such as welding, but such construction is unsatisfactory from the standpoint of protecting the shell 10 against the effects of varying road conditions. In other words, in the manufacture of the metallic shells 10, the various sheets of metal are welded together, presenting a relatively large number of seams and the twisting and turning of the supporting framework has deleterious effects upon the shell 10 not only at the seams but elsewhere throughout the length thereof.

In accordance with the principles of the instant invention there is no direct metal-to-metal joinder between the shell 10 and the underlying support 12—12; instead, there is provided a pair of longitudinal strips 16 of resilient material such as rubber or a suitable synthetic resilient substance. The strips 16 are contained within upwardly facing channel members 18 that are U-shaped in cross-section, presenting therefore, a bight or plate 20 and a pair of legs or upstanding longitudinal flanges 22.

The strips 16 are bonded through use of a suitable adhesive, both to the uppermost faces of the bights 20 and to the outermost face of the shell 10. Channel members 18 are in turn carried by the sills 12—12 through use of interposing frame means 24.

Under some conditions it may not be necessary to provide for the upstanding flanges 22 but they tend to hold the strips 16 in place and, therefore, against lateral displacement across the upper surfaces of the bights 20.

As an additional precaution and to limit the extent of lateral, as well as longitudinal, displacement of the shell 10 relative to the channel members 18, there are provided a plurality of retainers 26 and 28 for each strip 16—16 respectively and secured to the tank 10 and to the bights 20 respectively. A row of preferably equally spaced holes 30 formed in the strips 16, receive the retainers 26 and 28 which may take the form of small tubes welded directly to the tank 10 and to the bights 20 as the case may be as at 32 and 34 respectively.

A secondary advantage through the utilization of resilient strips 16—16 as a support or mounting means for the shell 10 is that it in effect floatingly saddles the shell 10 and to the end that the elements 16 may serve as shock-absorbing mediums, the thickness of the elements 16 is greater than the width of the flanges 22 and the height of the tubular retainers 26 and 28. It is seen, therefore, that even under loaded conditions the shell 10 is supported in its entirety by the elements 16 and that the retainers 26 and 28 are free to move with respect to the strips 16 in response to relative movement vertically between the tank 10 and the underlying channel members 18.

Here again, whereas the bonding of the elements 16 to the shell 10 and to the plates or bights 20 may be adequate to retain the shell 10 in place with respect to the chassis of the vehicle, the retainers 26 and 28 add stability and prevent undue lateral, as well as longitudinal movement of the shell 10 with respect to plates 20—20.

Having thus described the invention what is claimed as new and desired to be secured by Letters Patent is:

1. In a mobile vehicle, an elongated hollow tank; a tank-supporting chassis beneath the tank; and structure mounting the tank on the chassis comprising a number of spaced, elongated channel members extending longitudinally of the tank therebeneath and each provided with a bight and a pair of spaced, upstanding, longitudinal flanges, means securing the members to the chassis, an elongated strip of resilient material extending longitudinally of each member respectively, spanning the distance between the flanges thereof, and interposed between the tank and said bights, means bonding the strips to the tank and to the bights, each strip having a longitudinal series of holes, a retainer in each hole respectively, and means attaching the retainers alternately to the tank and to the bights.

2. In a mobile vehicle, an elongated hollow tank; a tank-supporting chassis beneath the tank; and structure mounting the tank on the chassis comprising a number of spaced, elongated channel members extending longitudinally of the tank therebeneath and each provided with a bight and a pair of spaced, upstanding, longitudinal flanges, means securing the members to the chassis, an elongated strip of resilient material extending longitudinally of each member respectively, spanning the distance between the flanges thereof, and interposed between the tank and said bights, means bonding the strips to the tank and to the bights, each strip having a longitudinal series of holes, a retainer in each hole respectively, and means attaching the retainers alternately to the tank and to the bights, the height of the flanges and the retainers being less than the thickness of the strips.

3. In structure for mounting a tank on the chassis of a mobile vehicle, an elongated channel member provided with a bight adapted for attachment to said chassis longitudinally of the latter, and a pair of spaced, longitudinal flanges; an elongated strip of resilient material adapted for attachment to said tank, said strip extending longitudinally of the member and spanning the distance between the flanges; means bonding the strip to said bight, said strip having a longitudinal series of holes; and a tubular retainer disposed in each hole respectively and secured to said bight.

4. In structure for mounting a tank on the chassis of a mobile vehicle, an elongated channel member provided with a bight adapted for attachment to said chassis longitudinally of the latter, and a pair of spaced, longitudinal flanges; an elongated strip of resilient material adapted for attachment to said tank, said strip extending longitudinally of the member and spanning the distance between the flanges; means bonding the strip to said bight, said strip having a longitudinal series of holes; and a tubular retainer disposed in each hole respectively and secured to said bight, the height of the flanges and the retainers being less than the thickness of the strip.

References Cited in the file of this patent

UNITED STATES PATENTS

| | | |
|---|---|---|
| 1,727,609 | Kramer | Sept. 10, 1929 |
| 1,856,399 | Phillips | May 3, 1932 |
| 2,037,024 | Holby | Apr. 14, 1936 |
| 2,606,039 | La Rue | Aug. 5, 1952 |
| 2,636,743 | Frazier | Apr. 28, 1953 |
| 2,715,510 | Fillion | Aug. 16, 1955 |

FOREIGN PATENTS

| | | |
|---|---|---|
| 531,459 | Great Britain | Jan. 3, 1941 |
| 288,927 | Switzerland | June 1, 1953 |